(12) United States Patent
Shadle (10) Patent No.: US 11,702,268 B2
(45) Date of Patent: *Jul. 18, 2023

(54) BONDING LABEL

(71) Applicant: W/S Packaging Group, Inc., Green Bay, WI (US)

(72) Inventor: Mark A. Shadle, Peachtree City, GA (US)

(73) Assignee: W/S Packaging Group, Inc., Batavia, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/373,252

(22) Filed: Jul. 12, 2021

(65) Prior Publication Data

US 2021/0339933 A1   Nov. 4, 2021

Related U.S. Application Data

(60) Division of application No. 16/749,492, filed on Jan. 22, 2020, now Pat. No. 11,059,646, which is a continuation-in-part of application No. 16/253,910, filed on Jan. 22, 2019, now Pat. No. 10,889,423.

(60) Provisional application No. 62/895,820, filed on Sep. 4, 2019.

(51) Int. Cl.
    *C09J 7/40*   (2018.01)
    *G09F 3/02*   (2006.01)
    *B65D 77/24*  (2006.01)
    *B65D 77/06*  (2006.01)

(52) U.S. Cl.
    CPC ........... *B65D 77/24* (2013.01); *B65D 77/062* (2013.01); *C09J 7/403* (2018.01); *C09J 2203/334* (2013.01); *C09J 2301/124* (2020.08); *G09F 2003/0225* (2013.01); *Y10T 428/14* (2015.01)

(58) Field of Classification Search
    CPC ...... B65D 77/24; B65D 77/062; B65D 5/603; B65D 2313/10; C09J 7/403; C09J 2301/124; C09J 2203/334; G09F 2003/0225; Y10T 428/14
    See application file for complete search history.

(56) References Cited

U.S. PATENT DOCUMENTS

| | | | | |
|---|---|---|---|---|
| 2,552,664 | A | * | 5/1951 | Burdine ............... C09J 7/21 442/151 |
| 2,800,215 | A | * | 7/1957 | Converse ............. B41J 29/17 400/702 |
| 5,458,938 | A | * | 10/1995 | Nygard ............... B42F 5/00 40/594 |

(Continued)

*Primary Examiner* — Patricia L. Nordmeyer
(74) *Attorney, Agent, or Firm* — Wood Herron & Evans LLP (57) ABSTRACT

A web of labels includes a face stock and a release liner. A top side adhesive layer extends on a top surface of the face stock and a top side release liner extends over the top side adhesive layer. The top side release liner includes at least one aperture exposing a corresponding portion of the top side adhesive layer. The face stock has a second adhesive layer on a bottom surface of the face stock. The release liner has a second release layer on a top surface thereof to protect the second adhesive layer, and a third release layer on a bottom surface of the release liner. The face stock is separated into a succession of labels carried on the release liner such that each label includes a portion of the top side release liner having at least one aperture.

7 Claims, 10 Drawing Sheets

(56) References Cited

U.S. PATENT DOCUMENTS

| | | | | |
|---|---|---|---|---|
| 5,587,214 A * | 12/1996 | Mitchell, Jr. | .......... | B31D 1/027 |
| | | | | 428/207 |
| 5,736,470 A * | 4/1998 | Schneberger | .............. | C09J 7/21 |
| | | | | 428/317.1 |
| 7,476,429 B2 * | 1/2009 | Bean | .................. | B65H 19/1836 |
| | | | | 428/354 |
| 10,889,423 B2 * | 1/2021 | Shadle | ................. | B65D 77/062 |
| 11,059,646 B2 * | 7/2021 | Shadle | ..................... | C09J 7/403 |
| 2015/0279242 A1 * | 10/2015 | Parks | ........................ | G09F 3/02 |
| | | | | 428/41.7 |

\* cited by examiner

BONDING LABEL

CROSS REFERENCE TO RELATED APPLICATIONS

The present application is a continuation in part of U.S. patent application Ser. No. 16/253,910 filed Jan. 22, 2019 entitled Bonding Label which contents are hereby expressly incorporated by reference and the present application claims the benefit of U.S. provisional patent application 62/895,820 filed Sep. 4, 2019 entitled Bonding Label which contents are hereby expressly incorporated by reference.

TECHNICAL FIELD

The present disclosure relates to bonding labels and particularly bonding labels for bonding one object surface to another object surface.

BACKGROUND OF THE INVENTION

Conventional labels include a face stock with an adhesive backing together with a release liner for protecting the adhesive backing prior to affixing the face stock to an object surface. Bonding labels include not only a backing adhesive for affixing the face stock to a first object surface but also include a top-side adhesive for bonding the face stock to a second object surface, which can be the surface of a different object. Together, the top-side and backing adhesives on opposites sides of the face stock provide for bonding the first and second object surfaces to each other.

Like the backing adhesive, the top-side adhesive requires protection against exposure to environmental influences that could weaken the adhesive prior to its intended use such as by unintended contact with other surfaces. A second release liner could be used to protect the top-side adhesive, but the addition of such a liner adds significantly to cost, creates extra waste, and requires an additional step of liner removal prior to bonding the top-side adhesive with a desired surface. Adhesive protection schemes are complicated by the need to protect the top-side and backing adhesive layers during different stages of intended use including during manufacture and transport of the labels in bulk and during separate stages at which the labels are affixed to the first and second object surfaces.

SUMMARY OF THE INVENTION

According to various aspects of the present disclosure, a bonding label having top-side and backing adhesives on opposite sides of a face stock includes a release liner for protecting the backing adhesive and two separate forms of protection for the top-side adhesive during different stages of intended use. For example, a first form of protection for the top-side adhesive can be provided during manufacture and transport of the bonding labels in bulk and a second form of protection for the top-side adhesive can be provided after the face stock portion of the bonding label is removed (i.e., delaminated) from the release liner and affixed to a first object surface and before the face stock portion of the bonding label is subsequently affixed to a second object surface. Such a bonding label is particularly useful for at least temporarily affixing one form of packaging material inside another form of packaging material. For example, the bonding label can be arranged to better secure or limit the relative motion of an inner package within an outer package.

One such aspect of the disclosure envisions a web of bonding labels comprising a face stock and a release liner. The face stock has a top surface and a bottom surface with both a first adhesive layer and a first release layer on the top surface of the face stock and a second adhesive layer on the bottom surface of the face stock. The release liner has a top surface and a bottom surface with a second release layer on the top surface of the release liner arranged to protect the second adhesive layer on the bottom surface of the face stock and a third release layer on the bottom surface of the release liner. The face stock is separated into a succession of bonding labels carried on the release liner such that each bonding label includes a first complementary area defined on the top surface of the face stock by at least a portion of the first adhesive layer and a second complementary area that is at least as large as the first complementary area defined on the top surface of the face stock by at least a portion of the first release layer. The third release layer on the bottom surface of the release liner is arranged to protect the first adhesive layer within the first complementary area of each bonding label when the succession of bonding labels carried on the release liner is wound into a roll. The first release layer within the second complementary area of each bonding label is arranged to protect the first adhesive layer within the first complementary area of each bonding label when the respective bonding labels are removed from the release liner and folded together.

Each of the bonding labels is preferably arranged to be folded about a designated fold line, and the second complementary area occupied by the first release layer encompasses one or more regions that are mirror projections of the first complementary area occupied by the first adhesive layer across the designated fold line. The first complementary area occupied by the first adhesive layer can be composed of a plurality of disconnected subareas, and the one or more regions of the second complementary area occupied by the first release layer can encompass mirror projections of the disconnected subareas across the designated fold line. Both the disconnected subareas occupied by the first adhesive layer and the regions occupied by the first release layer can be located together on both sides of the designated fold line.

The second adhesive layer can be arranged for affixing the bonding labels to respective first object surfaces with each so-affixed bonding label spanning an object fold line on one of the first object surfaces so that when the respective first object surfaces are folded together about the object fold lines, the first release layer within the second complementary area of each so-affixed bonding label covers the first adhesive layer within the first complementary area of each so-affixed bonding label. The first adhesive layer can be arranged to be affixed to second object surfaces after the first object surfaces are unfolded about their respective object fold lines.

The first object surfaces can comprise respective internal surfaces of an outer package to which the second adhesive layer is arranged to be affixed, and the second object surfaces can comprise respective external surfaces of an inner package to which the first adhesive layer is arranged to be affixed. Upon application of the bonding labels to the respective internal surfaces of the outer package, the outer package can be folded together for transport or storage in advance of a separate operation for unfolding the outer package and affixing the inner package to the bonding labels within the outer package. The first adhesive layer and the second adhesive layer can be composed of different adhesives for adhering to different packaging materials.

The first release layer can be printed on the top surface of the face stock in a succession of patterns such that each bonding label includes a pattern of the first release layer and a pattern of the first adhesive layer. For example, the first adhesive layer can flood coated on the top surface of the face stock, and the first release layer can be printed over portions of the first adhesive layer on the top surface of the face stock in the succession of patterns. Alternatively, the first adhesive layer can also be printed on the top surface of the face stock in a succession of patterns such that each bonding label includes a printed pattern of the first release layer and a printed pattern of the first adhesive layer. The third release layer can be flood coated on the bottom surface of the release liner to avoid a pattern alignment requirement with the pattern of the first adhesive layer when the succession of bonding labels carried on the release liner is wound into a roll. The bonding labels can be separated by die cuts against the release liner.

According to another aspect of the present disclosure, an outer package arranged for securing an inner package comprises a packaging material having at least one object fold line. A bonding label includes a face stock having a top surface and a bottom surface with both a first adhesive layer and a release layer on the top surface of the face stock and a second adhesive layer on the bottom surface of the face stock. The bonding label has a first complementary area defined on the top surface of the face stock by at least a portion of the first adhesive layer and a second complementary area that is at least as large as the first complementary area defined on the top surface of the face stock by at least a portion of the first release layer. The second adhesive layer affixes the bonding label to the packaging material in a location straddling the object fold line of the packaging material, and the packaging material is folded together about the object fold line such that release layer within the second complementary area of the bonding label covers the first adhesive layer within the first complementary area of the bonding label.

The packaging material can be arranged to be at least partly unfolded and reshaped as an outer package within which the first adhesive layer is exposed for securing an inner package within the outer package. The first adhesive layer and the second adhesive layer can be composed of different adhesives for adhering to different packaging materials. The first complementary area occupied by the first adhesive layer can be composed of a plurality of disconnected subareas. The bonding label can be arranged to be folded about a designated fold line, and the second complementary area occupied by the release layer can encompass regions that are mirror projections of the disconnected subareas across the designated fold line. Both the disconnected subareas occupied by the first adhesive layer and the regions occupied by the release layer can be located together on both sides of the designated fold line. For different reasons, the second complementary area occupied by the release layer can include regions on both sides of the designated fold line.

Yet another aspect of disclosure includes a packaging system including an outer package having an interior surface with an object fold line, an inner package within the outer package, and a bonding label including a face stock having a top surface and a bottom surface with both a first adhesive layer and a release layer on the top surface of the face stock and a second adhesive layer on the bottom surface of the face stock. The bonding label has a first complementary area defined on the top surface of the face stock by at least a portion of the first adhesive layer and a second complementary area defined on the top surface of the face stock by at least a portion of the first release layer. The second adhesive layer affixes the bonding label to the interior surface of the outer package in a location straddling the object fold line such that the second complementary area occupied by the release layer encompasses one or more regions that are mirror projections of the first complementary area occupied by the first adhesive layer across the object fold line. The first adhesive layer within the first complementary area affixes the bonding label to the inner package so that the inner package is attached to the outer package via the bonding label.

The first complementary area occupied by the first adhesive layer can be composed of a plurality of disconnected subareas, and the one or more regions of the second complementary area occupied by the release layer can encompass mirror projections of the disconnected subareas across the object fold line.

A further configuration of the disclosure provides a web of bonding labels, wherein the web includes a face stock having a top surface and a bottom surface with a top side adhesive layer on the top surface and a top side release liner on the top side adhesive layer and a second adhesive layer on the bottom surface of the face stock, wherein the top side release liner includes a plurality of apertures exposing corresponding areas of the top side adhesive layer; and a release liner having a top surface and a bottom surface with a second release layer on the top surface of the release liner arranged to protect the second adhesive layer on the bottom surface of the face stock and a third release layer on the bottom surface of the release liner.

An outer package arranged for securing an inner package is also disclosed, wherein the outer package includes a packaging material having at least one object fold line; a bonding label including a face stock having a top surface and a bottom surface with a top side adhesive layer on the top surface and a top side release liner on the top side adhesive layer and a second adhesive layer on the bottom surface of the face stock, wherein the top side release liner includes at least on aperture exposing a portion of the top side adhesive layer; the second adhesive layer affixing the bonding label to the packaging material in a location straddling an object fold line of the packaging material; and the packaging material being folded together about the object fold line such that a portion of the top side release liner covers the exposed portion of the top side adhesive layer.

Further disclosed is a packaging system including an outer package having an interior surface with an object fold line; an inner package within the outer package; a bonding label including a face stock having a top surface and a bottom surface with a top side adhesive layer and a top side release liner on the top side adhesive layer and a second adhesive layer on the bottom surface of the face stock, wherein the top side release liner includes at least one aperture exposing the top side adhesive; the second adhesive layer affixing the bonding label to the interior surface of the outer package in a location straddling the object fold line; and the top side adhesive layer exposed through the at least one aperture in the top side release liner and affixing the bonding label to the inner package so that the inner package is attached to the outer package via the bonding label.

DETAILED DESCRIPTION OF THE INVENTION

Figure 1:
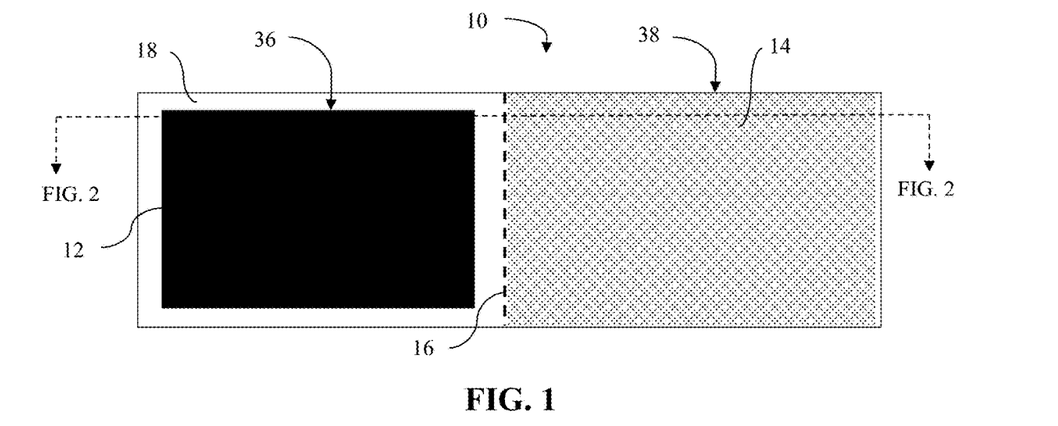
FIG. 1 is a top plan view of a first example of a bonding label in which an undivided complementary area of a top-side adhesive on a top surface of the bonding label is matched with a complementary area of a top-side release on the opposite side of a designated fold line.
Figure 2:
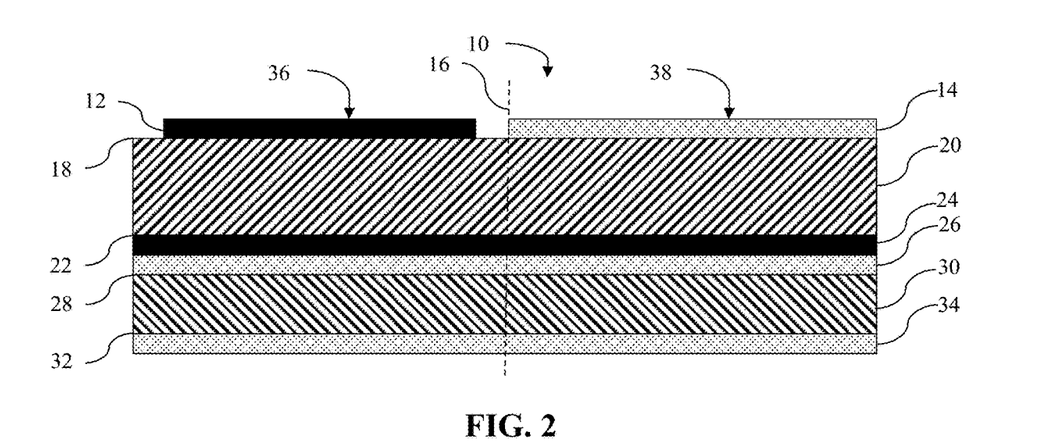
FIG. 2 is a cross sectional side view of the bonding label of FIG. 1 showing a layered construction that is greatly expanded in a thickness to more easily view the individual layers of the construction.

A bonding label 10 as depicted in FIGS. 1 and 2 includes two substrates in the form of a face stock 20 and a release liner 30. The face stock 20 can be made of a paper, film, composite, hybrid, or other material capable of supporting unstructured layers such as coatings suitable for its intended use. The release liner 30 can be made of a similar set of materials including calendered Kraft paper, biaxially oriented polypropylene (BOPP), and polyester film capable of supporting release coatings suitable for its intended use.

A top surface 18 of the face stock 20 supports a first adhesive layer 12 as a top-side adhesive and a first release layer 14 as a top-side release on opposite sides of a designated fold line 16 that bisects the bonding label 10. A bottom surface 22 of the face stock 20 supports a second adhesive layer 24 as a backing adhesive. While for many applications, the top-side and backing adhesives are expected to be chosen as pressure-sensitive adhesives, the top-side and backing adhesives can take other forms such as heat seal, co-adhesive, and UV activated adhesives and can differ from one another to provide desired characteristics of a permanent, removable, repositionable or any other adhesive technology that fits the end use requirements. The release is typically a cross linkable silicone but can take other forms such as other coatings or materials having low surface energy or otherwise matched to the adhesive it is intended to protect. For example, the top-side release of the first release layer 14 is matched to the top-side adhesive of the first adhesive layer to temporarily cover and protect the top-side adhesive while the bonding label 10 is folded together about the designated fold line 16 so that the top-side adhesive can be later separated from the top-side release without damaging its intended adhesive properties.

A top surface 28 of the release liner 30 supports a second release layer 26 as an intermediate release in contact with the second adhesive layer 24. A bottom surface 32 of the release liner 30 supports a third release layer 34 as a bottom-side release. While the intermediate release of the second release layer 26 is matched to the backing adhesive of the second adhesive layer 24, the bottom-side release of the third release layer 34, like the top-side release of the first layer 14, is matched to the top-side adhesive of the first adhesive layer 12. The bottom-side release of the third release layer 34 covers and protects the top-side adhesive of the first adhesive layer 12 while the bonding label 10 as a succession of bonding labels along a web is wound into a roll for transport of storage.

The top-side adhesive of the first adhesive layer 12 occupies an undivided but limited complementary area 36 defined on the top surface 18 of the face stock 20. The top-side release of the first release layer 14 occupies an undivided but larger complementary area 36 defined on the top surface 18 of the face stock 20. The complementary area 38 occupied by the top-side release is positioned so that the complementary area 36 occupied by the top-side adhesive is completely covered by the top-side release when the bonding label 10 or at least the face stock 20 and its supported layers are folded together about the designated fold line 16. In other words, the complementary area 38 of the top-side release encompasses the mirror projection of the complementary area 36 of the top-side adhesive across the designated fold line 16 as well as any additional remaining area to increase a tolerance for overlap or other purposes. While encompassing the mirror projection of the complementary area 36, the complementary area 38 of the top-side release can be larger than or even a different shape from the mirror projection of the complementary area 36 of the top-side adhesive. Both the complementary area 36 of the top-side adhesive and the complementary area 38 of the top-side release can be pattern printed on the top surface 18 of the face stock 20. The printing can be performed by a variety of processes including flexographic, screen, gravure, and digital printing techniques, as well as hybrid arrangements of known printing processes. The other layers 24, 26, and 32 of release and adhesive can be more economically flood coated over their respective supporting surfaces 22, 28, and 32, but other printing techniques can be used as well. Exposed areas as well as areas underlying the top-side adhesive and the top-side release on the top surface 18 of the face stock 20 can also be printed with conventional ink for such purposes as providing instructions, labeling information, or fiducial markers for positioning the bonding label 10 during use. For example, a marking designating the designated fold line 16 can be printed on the top surface 18 of the face stock 20. Alternatively, such a marking can be formed by creases or scores in the face stock 20, particularly for face stocks that might otherwise resist folding, or the designated fold line 16 can be made apparent from the patterns of the top-side adhesive and release or from other features of the bonding label 10.

Figure 3:
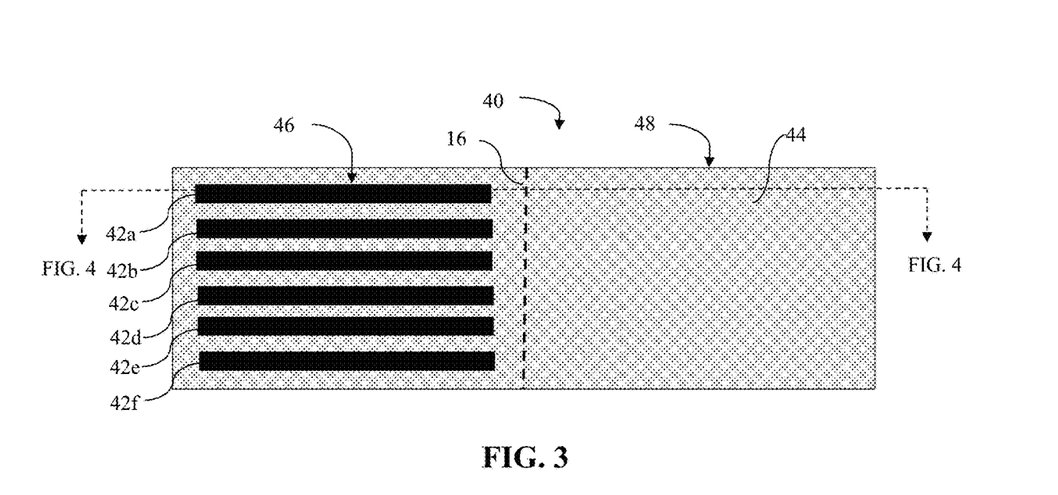
FIG. 3 is a top plan view of a second example of a bonding label in which complementary areas of a top-side adhesive and a top-side release are formed in a different way.
Figure 4:
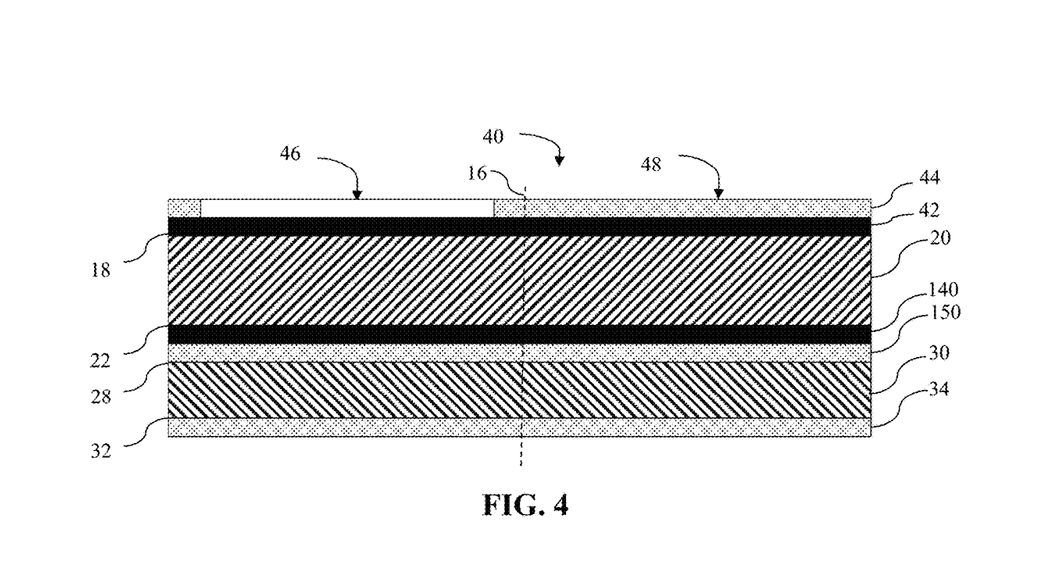
FIG. 4 is a cross sectional side view of the bonding label of FIG. 3.

Bonding label 40 depicted in FIGS. 3 and 4 is similar to the bonding label 10 with like reference characters designating corresponding structures. However, a first adhesive layer 42 is shown flood coated over the top surface 18 of the face stock 20, and a first release layer 44 is pattern printed over the first adhesive layer 42. A top-side release of the first release layer 44 is formulated or otherwise arranged with respect to a top-side adhesive of the first adhesive layer 42 to deaden any areas of the first adhesive layer 42 that are overlapped by the first release layer 44 while retaining desired release properties. In the illustrated pattern of the first release layer 42, the remaining complementary area 46 of still functional top-side adhesive comprises a set of separated subareas 42a through 42f in the form of stripes. While each of the subareas 42a through 42f that collectively define a complementary area 46 occupied by the top-side adhesive appear in the cross-sectional view of FIG. 4 as if recessed within windows through the first release layer 44, the complementary area 46 of the top-side adhesive effectively remains exposed at nearly the same level as the remaining complementary area 48 of the top-side release at the actual thickness of the bonding label 40.

Although the subareas 42a through 42f of the top-side adhesive are shown in the form of stripes, the top-side adhesive of the first adhesive layer 42 can be printed in any desired pattern such that the subareas of the top-side adhesive can be varied in size, shape, number, and position as desired for a given application. For example, the subareas can be fashioned as dots, outlines, polygons, swirls, or any freeform shape or combinations thereof and arranged in evenly distributed, progressively varying, or irregular patterns to suit the desired application. The complementary area 48 of the top-side release can be sized and shaped in either a divided or undivided format so that when folded about the designated fold line 16, the complementary area 48 of the top-side release covers the complementary area 46 of the top-side adhesive. Alternatively, separate deadening and release layers could be pattern printed to provide the desired complementary areas 46 and 48 for the functions of adhesion and release. Like the first adhesive layer 42, portions of the first release layer 44 that are not needed to protect the complementary area 46 of the top-side adhesive can be overprinted for one or more purposes and thereby excluded from the complementary area 48 of the top-side release.

Figure 5:
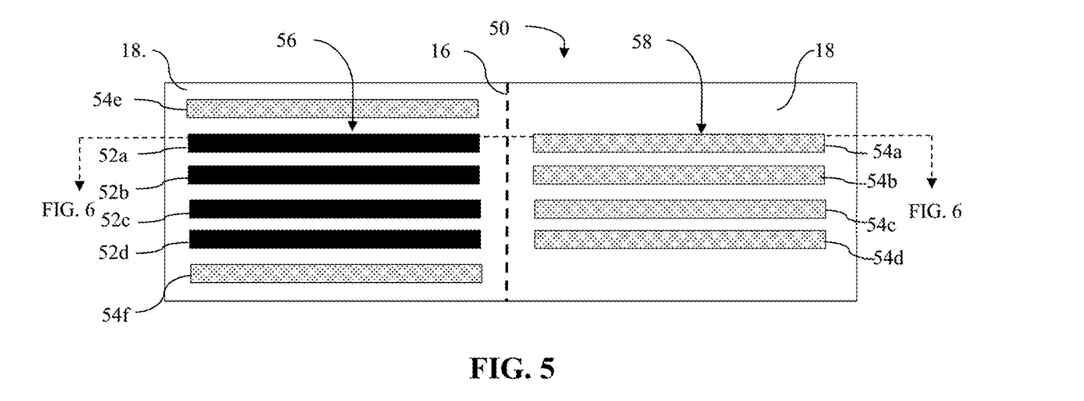
FIG. 5 is a top plan view of a third example of a bonding label in which complementary areas of the top-side adhesive and the top-side release are formed in as mirror symmetric subareas on opposite sides of a designated fold line.
Figure 6:
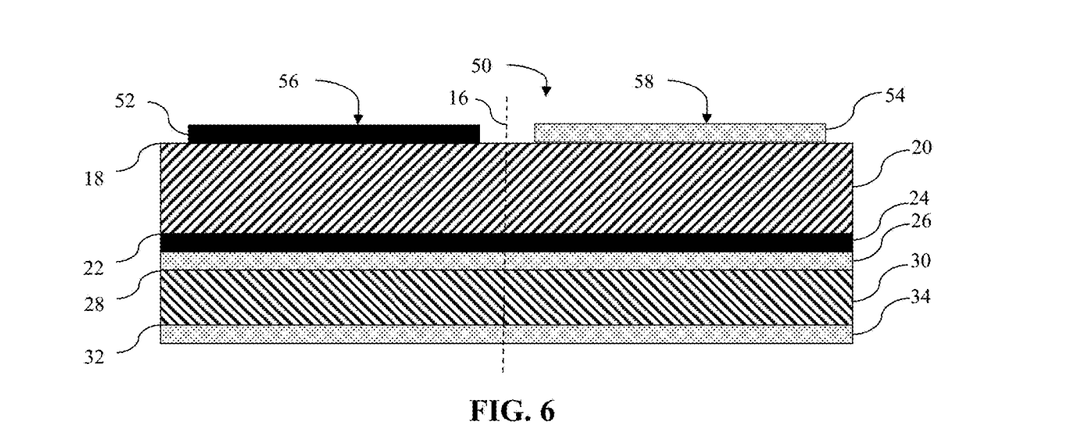
FIG. 6 is a cross sectional side view of the bonding label of FIG. 5.

Bonding label 50 depicted in FIGS. 5 and 6 is similar to the bonding labels 10 and 40 except for the arrangement of the top-side adhesive and top-side release. Both a first adhesive layer 52 and a first release layer 54 are pattern printed on the top surface 18 of the face stock 20. The first adhesive layer 52 is printed in four separate subareas 52a through 52d in the form of lateral stripes, which together define a complementary area 56 occupied by the top-side adhesive. The first release layer is printed in six separate subareas 54a through 54f, also in the form of lateral stripes However, only the subareas 54a through 54d contribute to a complementary area 58 that is intended to cover and protect the complementary area 56 of the top-side adhesive when folded together about the designated fold line 16. The subareas 54e and 54f of the top-side release on the same side of the designated fold line 16 as the subareas 52a through 52d of the top-side adhesive can be arranged for other purposes. In the bonding label 50, the subareas 54a and 54d of the top-side release are arranged as exact mirror projections of the subareas 52a through 52d of the top-side adhesive across the designated fold line 16. However, each of the subareas 54a and 54d of the top-side release are preferably larger than the subareas 52a through 52d of the top-side adhesive or are combined into an otherwise larger area to provide some tolerance for assuring that the complementary area 56 of the top-side adhesive is covered by the complementary area 58 of the top-side release in the folded condition.

Figure 7:
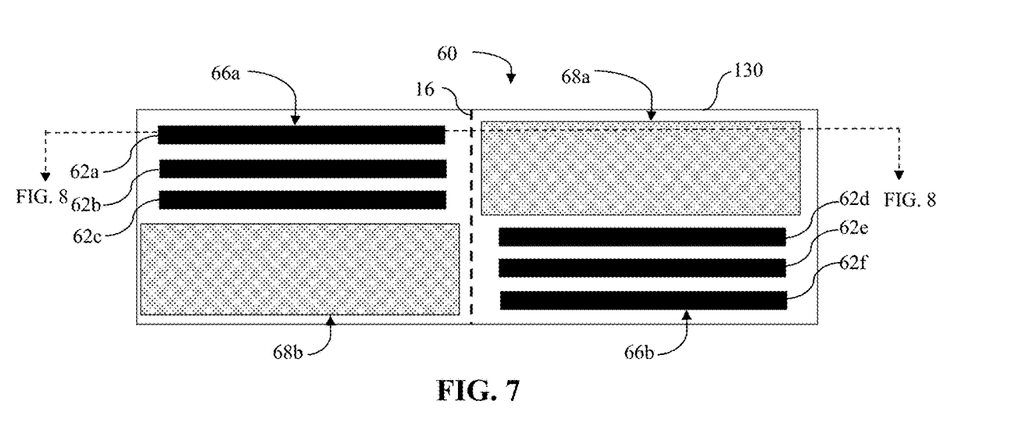
FIG. 7 is a top plan view of a fourth example of a bonding label in which complementary areas of the top-side adhesive and the top-side release are printed together on both sides of the designated fold line.
Figure 8:
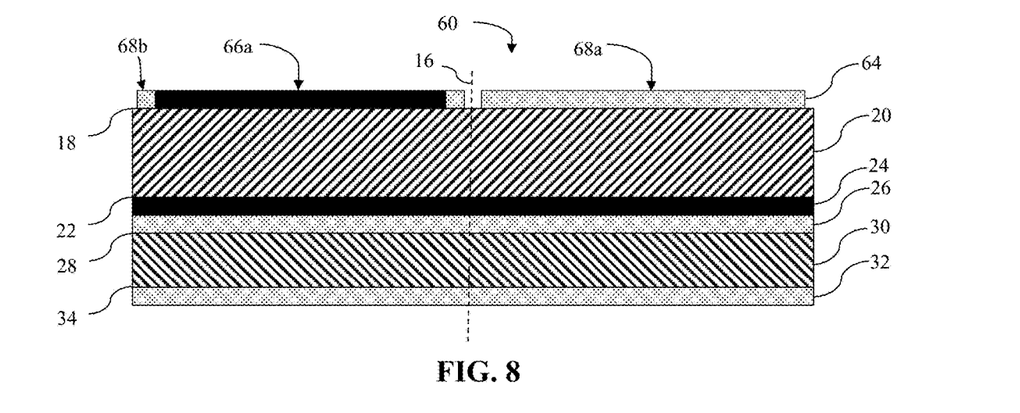
FIG. 8 is a cross sectional side view of the bonding label of FIG. 7.

Bonding label 60 depicted in FIGS. 7 and 8 is similar to the bonding labels 10, 40, and 50 but again differs in the arrangement of the top-side adhesive and top-side release. Both a first adhesive layer 62 and a first release layer 64 are pattern printed on the top surface 18 of the face stock 20. The first adhesive layer 52 is printed in three separate subareas 62a through 62c in the form of lateral stripes on the left side of the designated fold line 16 and is printed in three other separate subareas 62d through 62f in the form of lateral stripes on the right side of the designated fold line 16. The subareas 62a through 62c define a complementary area 66a occupied by the top-side adhesive on the left side of the designated fold line 16 and the subareas 62d through 62f define a complementary area 66b occupied by the top-side adhesive on the right side of the designated fold line 16. The first release layer 64 is printed in two separate undivided complementary areas 68a and 68b on opposite sides of the designated fold line 16. The complementary area 68a of the top-side release on the right side of the designated fold line 16 is arranged to encompass a mirror projection of the complementary area 66a of the top-side adhesive on the left side of the designated fold line 16. Similarly, the complementary area 68b of the top-side release on the left side of the designated fold line 16 is arranged to encompass a mirror projection of the complementary area 66b of the top-side adhesive on the right side of the designated fold line 16. Together, the complementary areas 68a and 68b of the top-side release cover and protect the complementary areas 66a and 66b of the top-side adhesive when folded together about the designated fold line 16.

As with any of the envisioned bonding labels, the top-side adhesive of the first adhesive layer 62 can be printed in any desired pattern such that the subareas of the top-side adhesive can be varied in size, shape, number, and position as desired for a given application. The top-side release of the first release layer 64 can also take a variety of divided or undivided forms encompassing mirror projections of the complementary areas of the top-side adhesive on opposite sides of the designated fold line 16. Similarly, the shape and size of the bonding label 60 as well as any of the other bonding labels 10, 40, or 50 as described herein can vary to fit its intended application. However, for purposes of protecting the bonding labels in a folded condition, the shape of the bonding labels is arranged to support a complementary area of release that encompasses a mirror projection of a complementary area of adhesive across a designated fold line. In addition, although the bonding labels 10, 40, 50, and 60 are depicted as individual bonding labels in isolation, the various bonding labels are preferably formed as a succession of bonding labels along a web in which the release liner 30 extends in an uninterrupted form along the length of the web.

Figure 9:
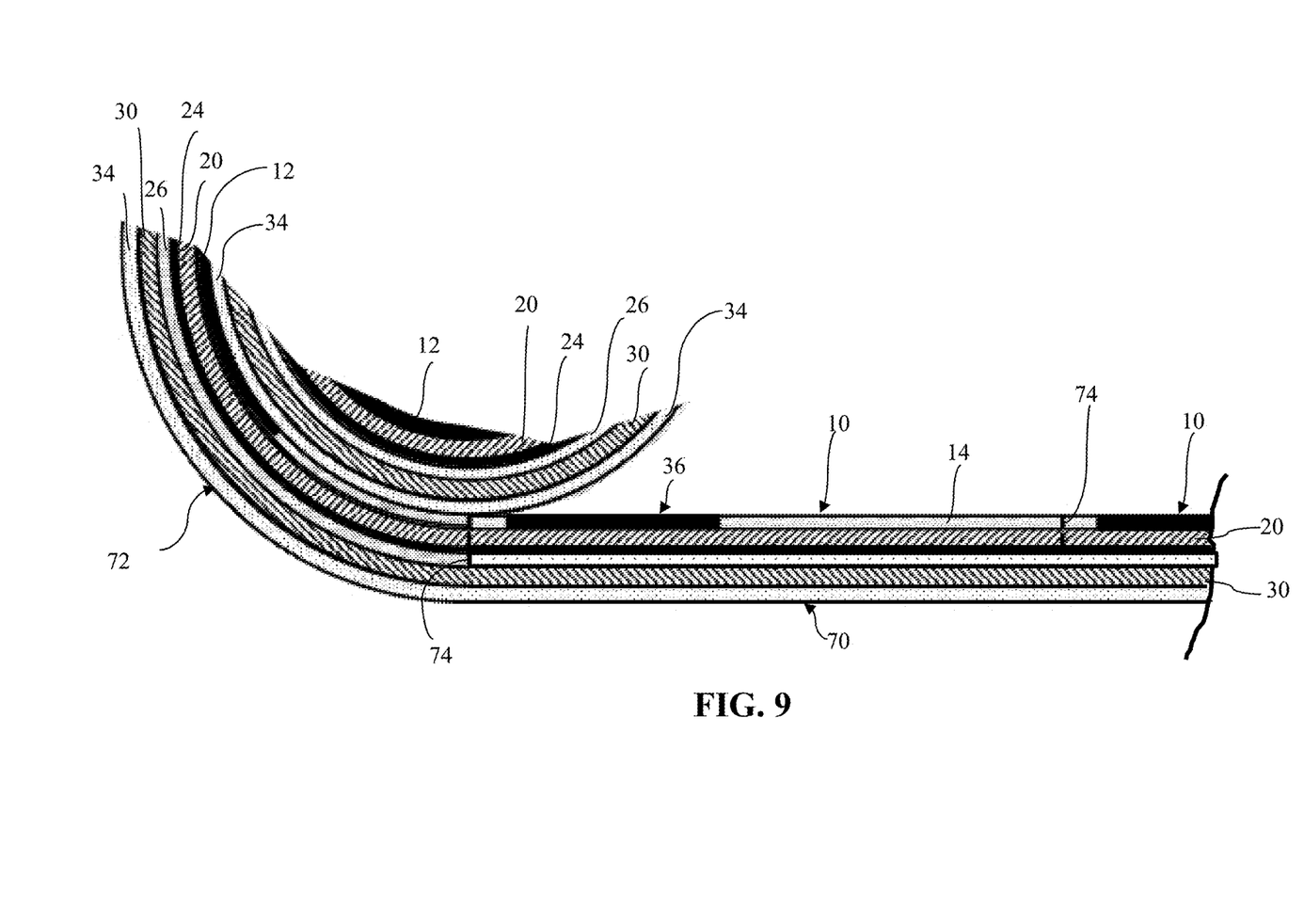
FIG. 9 is a cross sectional side view of a web of the bonding labels based on the bonding label of FIGS. 1 and 2 that is partially wound into a roll.

For example, FIG. 9 depicts a web 70 comprising a succession of the bonding labels 10 wound into a roll 72 for transport or storage. Die cuts (i.e., top scores) 74 through the face stock 20 separate the bonding labels 10 along the web 70 leaving the release liner 30 intact as a transport, handling, and protection mechanism for the bonding labels 10. Additional die cutting together with matrix removal can be used to further separate or otherwise ready the bonding labels for automated dispensing or for other purposes. Within the roll 72, the third release layer 34 on the bottom surface 32 of the release liner 30 covers and protects the complementary area 36 of the top-side adhesive within the adhesive layer 12 on the top surface 18 of the face stock 20. The uninterrupted form of the third release layer 34 provides for covering and protecting the complementary areas 36 of the adhesive layer 12 independently of any registration between the overlapping bonding labels 10 to avoid any occurrence of "blocking" or seizing together within the roll 72 during storage or transport of the web 70. The third release layer 34 also allows the web 70 to be unrolled so that the face stock portion of the bonding labels 10 (also often referred to as labels in and of themselves) can be removed from the web 70, i.e., separated from the release liner 30, and affixed to a desired object surface. While the web 70 is depicted with an inside wind, an outside wind could be used to similar effect. Although the web 70 is formed by a succession of the bonding labels 10, the web 70 can comprise a succession of any of the bonding labels 40, 50, or 60 as depicted and as described.

The web 70 can be made on a single press or on multiple presses in a succession of stages. For example, separate rolls of the face stock 20 and the release liner 30 can be fed into a press along which the various layers 12, and 24 of adhesive and the various layers 14, 26, and 34 of release can be applied to the face stock 20 and the release liner 30 in a series of coating or printing operations while also laminating the coated face stock to the coated release liner before winding the web into a roll. Alternatively, a web of conventional label stock comprising the face stock 20 with an adhesive backing layer 24 laminated to the release liner 30 via the intermediate release layer 26 can be fed into a press for applying the adhesive and release layers 12 and 14 to the top surface 18 of the face stock 20 and applying the release layer 34 to the bottom surface 32 of the release liner 30 before rewinding the web into a roll for transport or storage. The first adhesive layers 12, 52, and 62 of the bonding labels 10, 50, and 60 are preferably pattern printed while the first adhesive layer 42 of the bonding label 40 is preferably flood coated. Pattern printing is also preferably used for applying the first release layers 14, 44, 54, and 64.

Figure 10:
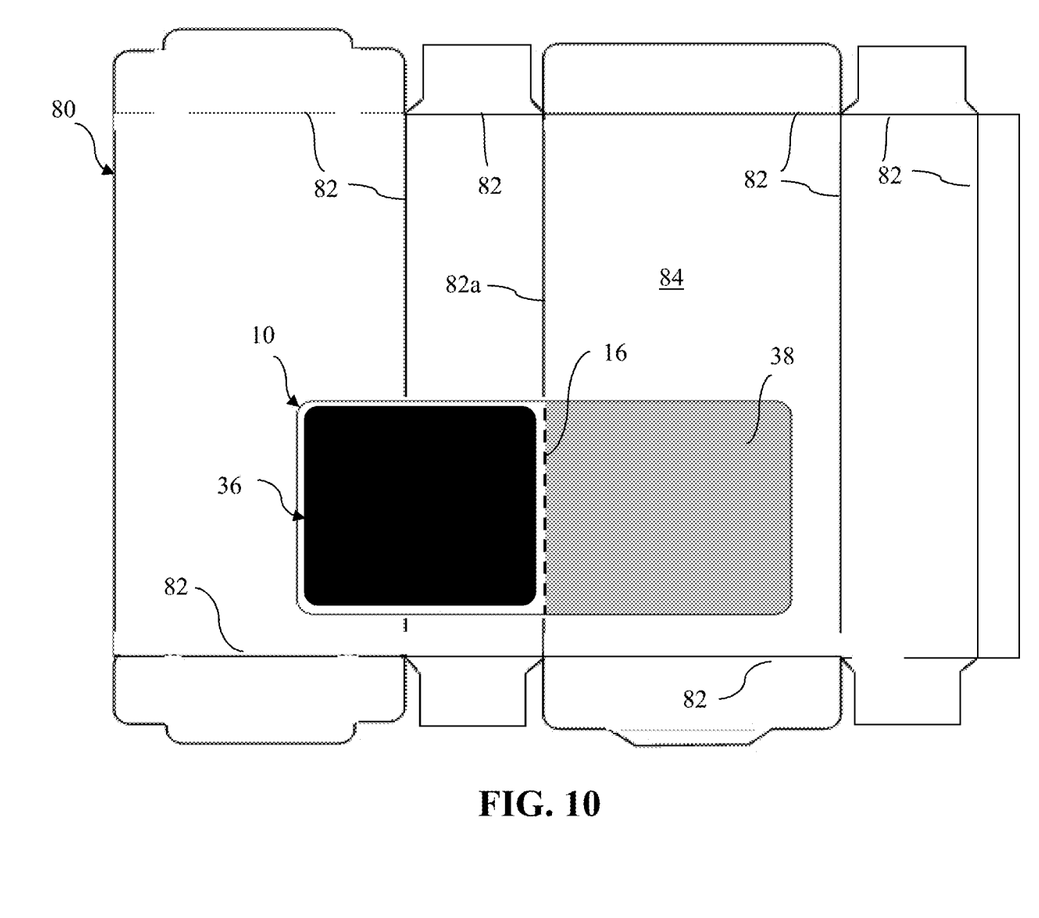
FIG. 10 is a top plan view of an interior surface an outer package in a flattened state with a bonding label removed from the release liner along the web and affixed to the interior surface straddling an object fold line of the outer package.

FIG. 10 depicts a flattened outer package 80 arranged as a type of packaging material that is intended to be folded into a three-dimensional form such as a box, carton, or other container. The outer package includes a plurality of object fold lines 82, which can be formed as creases or scores in an internal surface 84 of the outer package 80 or can merely correspond to internal die lines of a template from which the packaging material is shaped into the outer package 80. For purposes of storage or transport, the outer package 80 is intended to be folded together about a particular object fold line 82a. The face stock portion of the bonding label 10, which has been removed from the web 70 is affixed to the internal surface 84 in a position that aligns the designated fold line 16 of the bonding label with the object fold line 82a of the outer package 80. The face stock portions of any of the bonding labels 40, 50, or 60 as described herein can be similarly affixed. This affixing process can be automated by an applicator within which the web 70 can be unrolled and the individual bonding labels 10 (devoid of the release liner) can be stripped from the web 70 and applied to a succession of flattened outer packages 80. The applicator can be incorporated into a process or machine in which the outer package 80 is itself formed by die cuts through a packaging material.

The face stock portion of the bonding labels 10, which are separated from one another by the die cuts 74, can be stripped from the web 70 by separating the second adhesive layer 24 carried on the back surface 22 of the face stock from the second release layer 26 carried on the release liner 30. The second adhesive layer 24 affixes the bonding label 10 (devoid of its release liner) to the internal surface 84 of the outer package. The backing adhesive of the second adhesive layer 24 can be matched to the surface and material characteristics of the packaging material to which it is intended to be affixed. Since, the second adhesive layer spans both sides of the designated fold line 16, the face stock portion of the bonding label 10 is adhered to the interior surface 84 of the outer package on both sides of the object fold line 82a. The remaining release liner 30 can be rerolled for recycling.

In the view of FIG. 10, both the complementary area 36 occupied by the top-side adhesive and the complementary area 38 occupied by the top-side release are exposed on the internal surface 84 of the outer package 80. While the exposed area of the top-side adhesive is intended for securing an inner package or other article within the outer package 80, the process for assembling the outer package 80 and affixing the inner package or other article within the outer package 80 typically takes place at a different location or subsequent time during which the exposed adhesive requires protection against environmental interactions or unintended contact with other surfaces. The outer package 80 is arranged to be folded together about the object fold line 82a, and the face stock portion of the bonding label 10, whose designated fold line 16 is aligned with the object fold line 82a, is folded together with the outer package 80. In this way, the outer package 80 can be stored and transported for later use while protecting the top-side adhesive within the complementary area 36.

Figure 11:
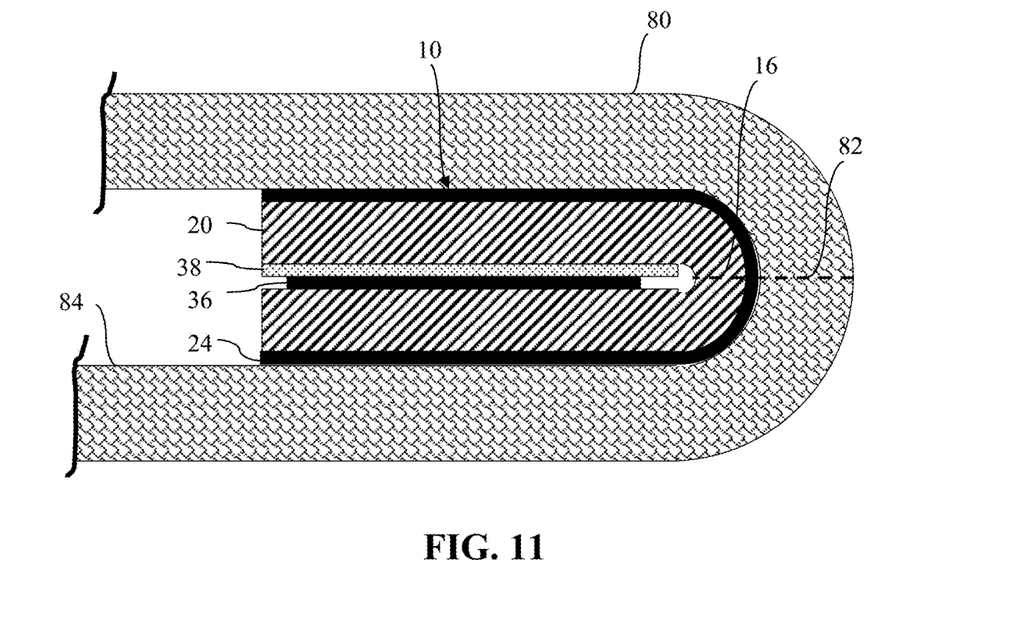
FIG. 11 is a cross sectional side view of a portion of the outer package and the bonding label of FIG. 10 folded together about the object fold line.

FIG. 11 shows a portion of the outer package 80 and the face stock portion of the bonding label 10 folded together about their respective fold lines 82a and 16. Once again, the thicknesses of the layers have been greatly enlarged for purposes of more clearly showing the layers. In this folded condition, the complementary area 36 of the top-side adhesive is completely covered by the complementary are 38 of the top-side release to protect the top-side adhesive until the outer package 80 is assembled and otherwise readied to receive its intended contents. Similarly, the complementary areas 46, 56, and 66a and 66b of top-side adhesive in the bonding labels 40, 50, and 60 are matched by the complementary areas 48, 58, and 68a and 68b of the top-side release that encompasses mirror projections of the complementary areas 46, 56, and 66a and 66b across the designated fold line 16 of these bonding labels. Thus, when the face stock portions of any of these bonding labels 10, 40, 50, or 60 are folded together with the outer package 80, the complementary areas 36, 46, 56, and 66a and 66b of top-side adhesive are covered by the matching complementary areas 38, 48, 58, and 68a and 68b of the top-side release. The top-side adhesive within the complementary areas 36, 46, 56, and 66a and 66b remains protected until the outer package 80 is unfolded and reshaped into its desired form, wherein the same complementary areas 36, 46, 56, and 66a and 66b of the top-side adhesive are exposed for intended use for bonding to an inner package.

Figure 12:
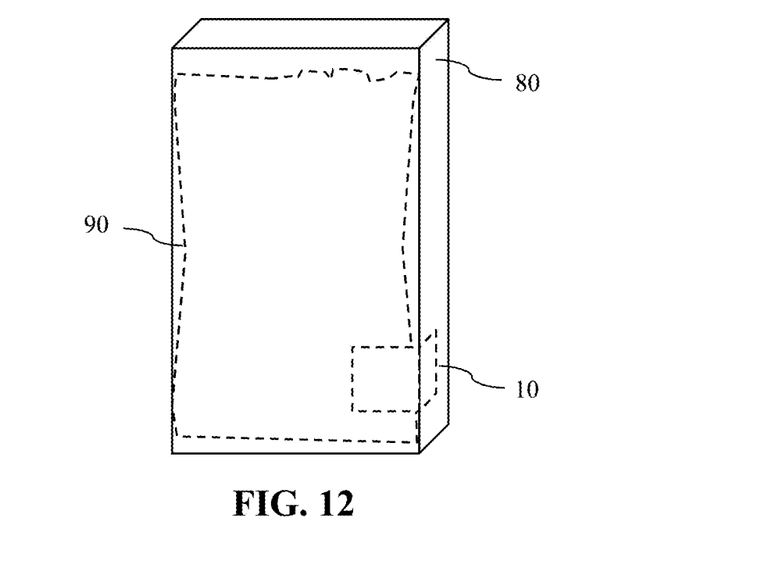
FIG. 12 is a perspective view of the outer package of FIGS. 10 and 11 shaped into a box for receiving an inner package (shown by hidden line) that is affixed to the outer package by the bonding label (also shown by hidden line).

In FIG. 12, the outer package 80 in an assembled state is shown as a box with an inner package 90 shown as a deformable bag within the outer package 80. The face stock portion of the bonding label 10, which is affixed to the interior surface 84 of the outer package via the second adhesive layer 22, is also affixed to an outer surface of the inner package 90 via the first adhesive layer 12. That is, the complementary area 36 of the top-side adhesive bonds the bonding label 10 to the inner package 90 for attaching the inner package 90 to the outer package 80. The top-side adhesive of the first adhesive layer 12 can be matched to the surface and material characteristics of the packaging material with which the inner package 90 is made and can differ from the adhesive used to affix the face stock portion of the bonding label to the outer package 80. The continuous or discontinuous patterns of the complementary areas 36, 46, 56, and 66a and 66b of top-side adhesive in any of the bonding labels 10, 40, 50, and 60 can also be selected to form an appropriate bond with the inner package 90 as the inner package 90 is placed or filled within the outer package 80.

The inner and outer packages that can be bound together by the envisioned bonding labels can take a variety of forms and can be made from a variety of materials. For example, either one of the outer or inner packages can have a fixed or more amorphous shape. For example, the outer package can take the form of a box, carton, tray, or tube and the inner package can take the form of a bag, bottle, packet, canister, tube, or other container for holding dry or wet materials or can comprise a product itself. The bonding labels can be used to secure the inner packages within outer packages and to limit at least some relative motion that might otherwise damage the inner packages or their contents. The bonding labels can also be used to provide tamper evidence or otherwise discourage the removal of a product from its outer packaging.

A fifth example of the bonding label is shown in FIGS. 13-17. In this example, the top side adhesive 36, 46, 56, 66 and the top side release areas 38, 48, 58, 68 of the prior examples are replaced by a top side adhesive layer 110 and an overlying top side release liner 130 on the top side adhesive layer.

Figure 13:
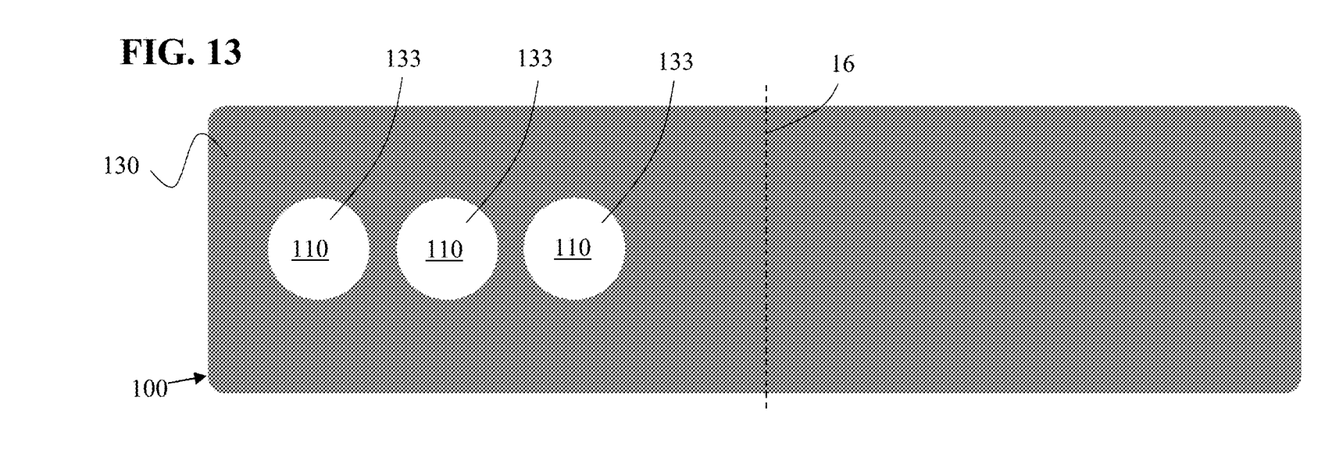
FIG. 13 is a top plan view of a fifth example of the bonding label.

In this example, the top side adhesive layer 110 can be printed (or coated, such as flood coated) over the entire top surface of the face stock 20. The top side adhesive layer 110 can be directly bonded to the face stock 20 or can be separated by an intermediate layer (not shown). Thus, the top side adhesive layer 110 being on or bonded to the top surface 18 of the face stock 20 encompasses direct bonding as well as indirect bonding.

The top side release liner 130 is then disposed over the top side adhesive layer 110. The top side release liner 130 includes a plurality of apertures, windows or recesses which can extend from at least one lateral edge of the top side release liner 130 that expose the underlying top side adhesive layer 110, collectively referred to apertures 133.

Figure 14:
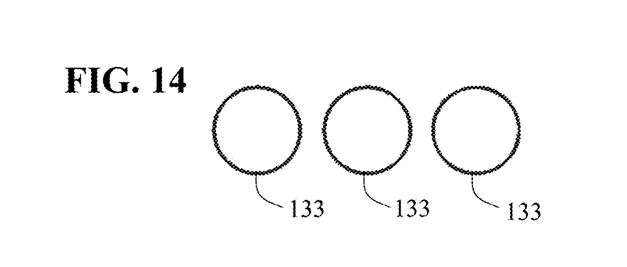
FIG. 14 is a plan view of a plurality of representative apertures in a top side release liner of the bonding label of FIG. 13.

As seen in FIG. 13, the top of the bonding label 100 is primarily defined by the top side release liner 130, with the exception of the apertures 133 in the top side release liner which expose corresponding areas of the underlying top side adhesive layer 110. Representative apertures 133 are seen in FIG. 14. However, it is understood the apertures 133 can be in any type of pattern and/or shape, wherein the exposed area of the top side adhesive layer 110 is functionally balanced against the necessary adhesive between the exposed areas of the top side adhesive layer and the inner package (or container) 90 against the resistance to insertion of the inner package (or container) into the outer package (or container) 80. Thus, the apertures 133 can be slots, a range of areas, shapes or merely recesses from the lateral edge or edges of the top side release liner 130. A plurality of the apertures can have different sizes within a given bonding label 100. The term aperture is intended to encompass each of these configurations. It is understood the apertures 133 can be formed by any of a variety of mechanisms known in the art, including but not limited to die cut, stamping, laser or blades.

Figure 15:
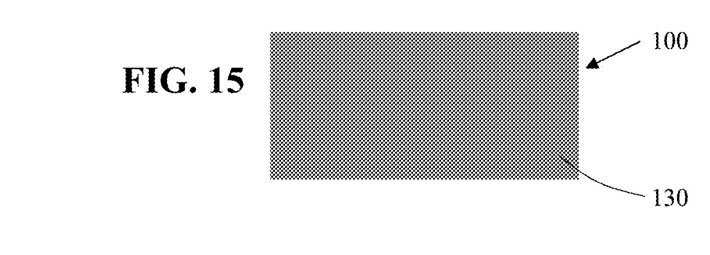
FIG. 15 is a top plan view of a portion of the apertures of the top side release liner of FIG. 14.

As seen in FIG. 15, the remaining portion of the top side release liner 130 defines the exposed surface of the bonding label 100.

Figure 16:
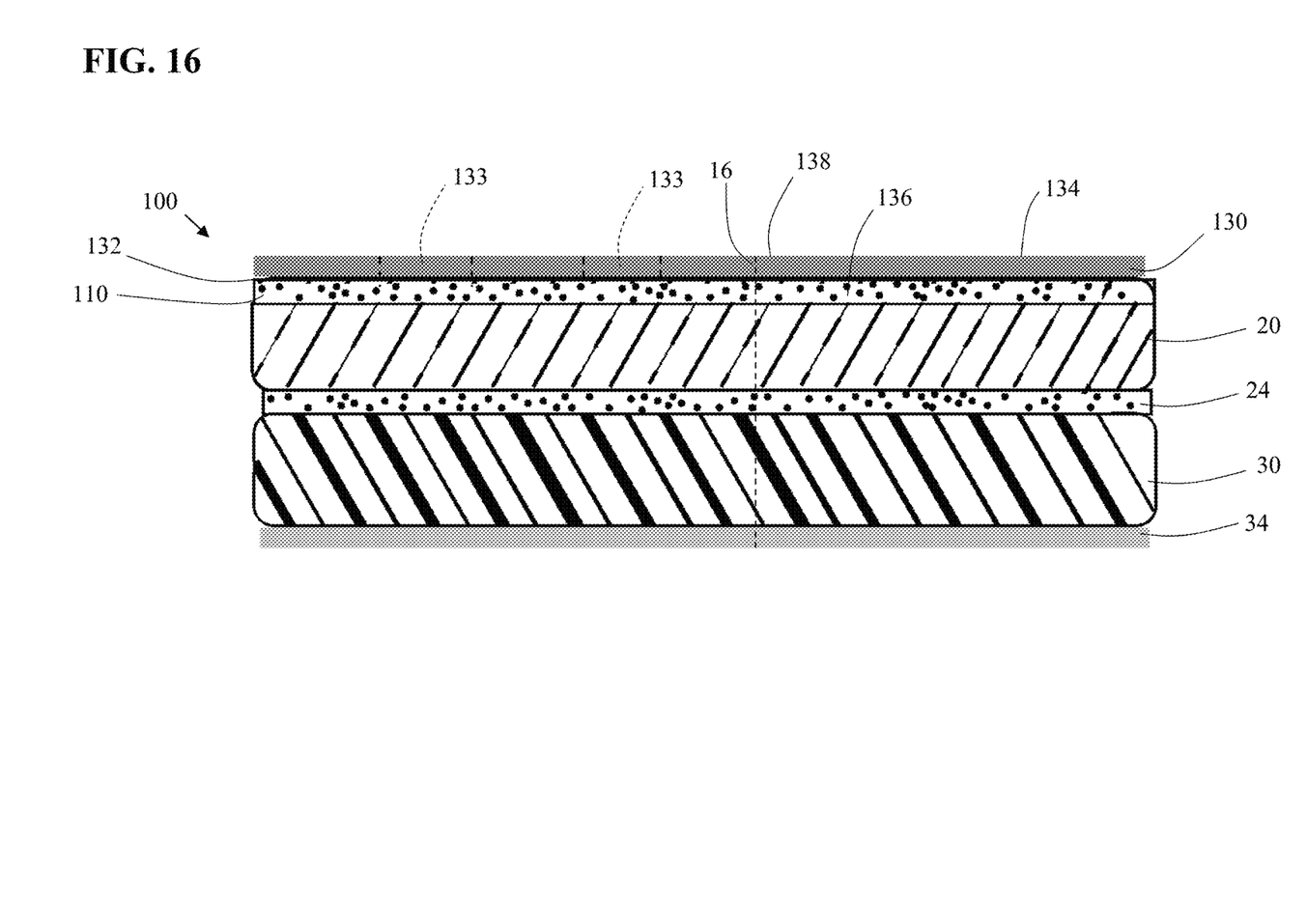
FIG. 16 is a cross sectional view of the bonding label of FIG. 13.

Referring to FIG. 16, the complimentary areas of the top side adhesive and release areas in the first four examples are replaced with (i) a layer of top side adhesive layer 110 which can be continuous over the area of the bonding label 100 and (ii) the apertured top side release liner 130, which defines the exposed areas of the top side adhesive layer 110 by virtue of the apertures 133.

The top side release liner 130 has a bottom surface 132 that bonds to the top side adhesive layer 110 to preclude unintended separation. A top surface 134 of the top side release liner 130 is, or is coated with, a release agent, such as silicone release, that does not materially bond to the top side adhesive layer 110. Thus, when the bonding label 100 is bonded to the outer package 80 and folded with the outer package along the common fold line 16, the top surface 134 of the top side release liner 130 contacts the exposed portions of the top side adhesive layer 110 through the apertures 133 to protect the exposed adhesive, but does not bond to the top side adhesive layer. Thus, the outer package 80 and bonded bonding label 100 can be shipped in an assembled but flattened configuration. Then upon erecting the outer package 80, the top surface 134 of the top side release liner 130 separates from the top side adhesive layer 110 and the portions of the top side adhesive layer exposed through the apertures 133 in the top side release liner are exposed for bonding to the inner package 90.

The top side release liner 130 can be a PET release liner, having a silicone or silicone treated top surface 134 that does not materially bond to the top side adhesive layer 110 and a raw or treated bottom surface 132 that bonds to the top side adhesive layer. It is understood the top side release liner 130 can include PET or polyester, film or even coated paper based liners. The top side release liner 130 thus includes a bonding surface 136 for bonding to the top side adhesive layer 110 and a release surface 138 for releasing from the top side adhesive layer.

While the apertures 133 are shown on a common side of the fold line 16, it is understood there can be apertures in the top side release liner 130 on both sides of the fold line so long as the mirror portion of the top side release liner is not apertured (thereby precluding areas of the top side adhesive layer 110 from contacting upon folding about the fold line 16.) Thus, the pattern of apertures 133 in the top side release liner 130 is limited only by precluding the apertures on opposing sides of the fold line 16 from aligning upon the bonding label 100 being folded about the fold line 16.

The apertures 133 in the top side release liner 130 can be at least partly dictated by the intended material of the inner package 90 and the anticipated insertion parameters of the inner package relative to the outer package 80.

The top side release liner 130 can be on the order of 1 mil thick, so the underlying exposed portion of the top side adhesive layer 110 is in contact with the inner package 90 even though the adhesive is slightly recessed (by the approximately 1 mil thickness of the top side release liner) from the surface of the top side release liner. In those instances where the inner bag 90 is full and is forced into the assembled outer package 80 (carton or container), the very tight fit of the bag can generate a jamming of the process. The apertured top side release liner 130 overlying the top side adhesive layer 110 reduces the drag on the inner bag when the inner bag is loaded.

Thus, the top side release liner 130 configuration can be used in providing the bonding label 100 for operably retaining a bag in box construction, wherein the bonding label includes the top side release liner 130, such as a thin PET, over the top of the top side adhesive layer 110, such as a pressure sensitive adhesive, and the apertures 133, such as die cut holes, in the top side release liner expose portions of the underlying top side adhesive layer in the specific spots needed for proper adherence to the inner retained flexible bag. It is understood the respective adhesives can be selected to preclude unintended separation or even preclude non-destructive separation, wherein the strength of the respective adhesive is at least partly based on the intended operating environment.

Figure 17:
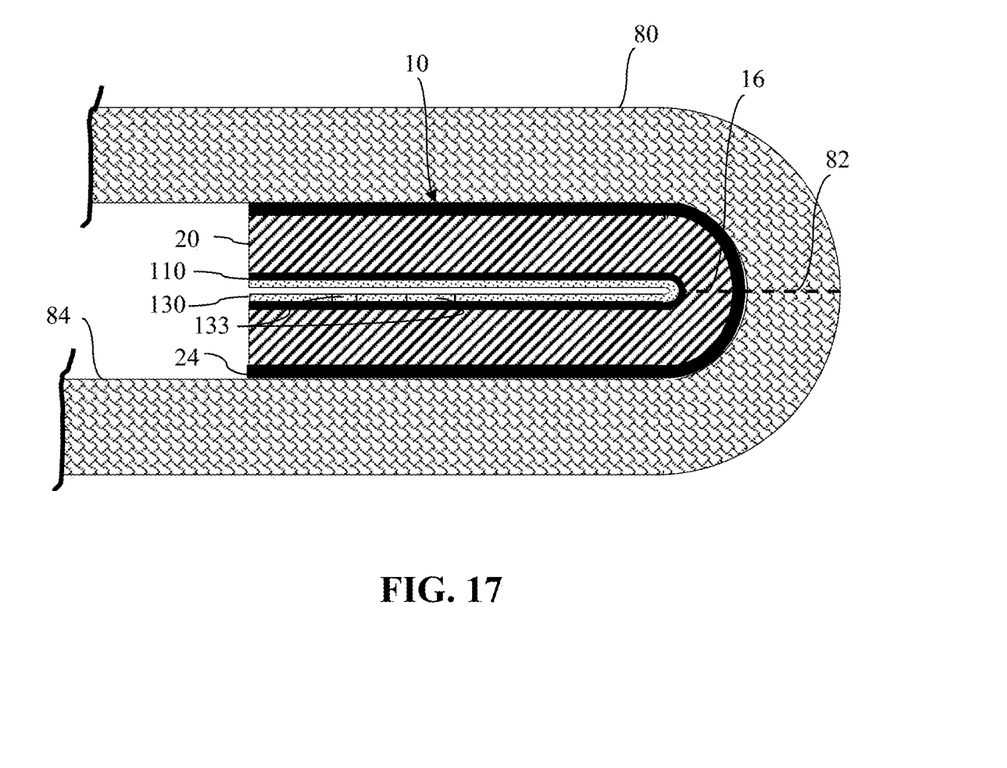
FIG. 17 is a cross sectional side view of a portion of the outer package and the bonding label of FIG. 16 folded together about the object fold line.

FIG. 17 shows a portion of the outer package 80 and the face stock portion of the bonding label 10 folded together about their respective fold lines 82 and 16. Once again, the thicknesses of the layers have been greatly enlarged for purposes of more clearly showing the layers. In this folded condition, the apertures 133 in the top side release liner 130 that expose corresponding portions of the underlying top side adhesive layer 110 are covered by the folded over area of the top side release liner so that the top side adhesive layer remains protected. The folded over portion of the top side release liner 130 continues to protect the aperture exposed areas of the top side adhesive layer 110 until the outer package 80 is assembled and otherwise readied to receive its intended contents. Thus, when the face stock portions of the bonding label 100 are folded together with the outer package 80, the top side adhesive layer 110 otherwise exposed through the apertures 133 in the top side release liner 130 are covered by the folded over portion of the top side release liner. The top side adhesive layer 110 remains protected until the outer package 80 is unfolded and reshaped into its desired form, wherein the overlying folded portion of the top side release liner 130 exposes the apertures 133 in the adjacent portion of the bonding label 100 and hence exposes the corresponding portions of the top side adhesive layer 110, wherein the now exposed portions of the top side adhesive layer are exposed for intended use for bonding to the inner package 90.

This construction assists in an automatic loading of a full inner bag 90 into an erected outer box 80 as the resistance that the bonding label 100 exerts on the inner bag is controlled by covering the entire surface of the top side adhesive layer 110 with the apertured top side release liner 130, such as a 1 mil PET release liner (other thin release liners would also work) with the release surface up (exposed to the inner bag).

Those of skill in the art will appreciate that the bonding labels described herein, particularly such bonding labels having top-side adhesive is protected by different layers of release in different states of use, can be used in various ways for bonding one object surface to another. Although described with respect to a limited number of examples, additional changes, modifications, and uses will be apparent within the overall teaching as understood by those of skill in the art.

The invention claimed is:

1. An outer package arranged for securing an inner package comprising: a packaging material having at least one object fold line;
   a bonding label including a face stock having a top surface and a bottom surface with a top side adhesive layer on the top surface and a top side release liner on the top side adhesive layer and a second adhesive layer on the bottom surface of the face stock, wherein the top side release liner includes at least one aperture exposing a portion of the top side adhesive layer;
   the second adhesive layer affixing the bonding label to the packaging material in a location straddling an object fold line of the packaging material; and
   the packaging material being folded together about the object fold line such that a portion of the top side release liner covers the exposed portion of the top side adhesive layer.

2. The outer package of claim 1, wherein the packaging material is arranged to be at least partly unfolded and reshaped as an outer package within which the top side adhesive layer is exposed for securing an inner package within the outer package.

3. The outer package of claim 1, wherein the top side adhesive layer and the second adhesive layer are composed of different adhesives for adhering to different packaging materials.

4. The outer package of claim 1, further comprising a plurality of apertures in the top side release liner.

5. The outer package of claim 1, wherein the bonding label is arranged to be folded about a designated fold line, wherein the apertures in the top side release liner are covered by remaining portions of the top side release liner upon being folded about the designated fold line.

6. The outer package of claim 1, wherein the bonding label is arranged to be folded about a designated fold line, and the apertures in the top side release liner are disposed about opposing sides of the designated fold line such that the top side adhesive layer is precluded from contacted another portion of the top side adhesive layer through the apertures.

7. A packaging system comprising:
   an outer package having an interior surface with an object fold line; an inner package within the outer package;
   a bonding label including a face stock having a top surface and a bottom surface with a top side adhesive layer and a top side release liner on the top side adhesive layer and a second adhesive layer on the bottom surface of the face stock, wherein the top side release liner includes at least one aperture exposing the top side adhesive;
   the second adhesive layer affixing the bonding label to the interior surface of the outer package in a location straddling the object fold line; and
   the top side adhesive layer exposed through the at least one aperture in the top side release liner and affixing the bonding label to the inner package so that the inner package is attached to the outer package via the bonding label.

* * * * *

UNITED STATES PATENT AND TRADEMARK OFFICE
CERTIFICATE OF CORRECTION

| | |
|---|---|
| PATENT NO. | : 11,702,268 B2 |
| APPLICATION NO. | : 17/373252 |
| DATED | : July 18, 2023 |
| INVENTOR(S) | : Mark A. Shadle |

It is certified that error appears in the above-identified patent and that said Letters Patent is hereby corrected as shown below:

In the Specification

Column 3, Line 5, "can flood coated" should be --can be flood coated--.

Column 3, Line 35, "such that release layer" should be --such that the release layer--.

Column 4, Lines 39-40, "at least on aperture" should be --at least one aperture--.

Column 5, Line 15, "formed in as mirror symmetric subareas" should be --formed as mirror symmetric subareas.--.

Column 5, Lines 28-29, "surface an outer package" should be --surface of an outer package--.

Column 7, Line 27, "appear" should be --appears--.

Column 10, Line 54, "encompasses" should be --encompass--.

Column 12, Line 14, "complimentary" should be --complementary--.

Column 13, Line 39, "are covered" should be --is covered--.

Column 13, Line 60, "adhesive is protected" should be --adhesive, are protected--.

In the Claims

Column 14, Line 43, Claim 6, "contacted" should be --contacting--.

Signed and Sealed this
Twelfth Day of September, 2023

Katherine Kelly Vidal
*Director of the United States Patent and Trademark Office*